July 4, 1967 W. E. WIER 3,329,886
ALTERNATOR HAVING CONSTANT FREQUENCY TO VOLTAGE RATIO
OUTPUT AND PROTECTIVE CIRCUIT
Filed Feb. 27, 1964

WITNESSES:
John L. Chopp
James T. Young

INVENTOR
Walter E. Wier
BY Donald R. Lackey
ATTORNEY 3,329,886
ALTERNATOR HAVING CONSTANT FREQUENCY TO VOLTAGE RATIO OUTPUT AND PROTECTIVE CIRCUIT
Walter E. Wier, Lima, Ohio, assignor to Westinghouse Electric Corporation, East Pittsburgh, Pa., a corporation of Pennsylvania
Filed Feb. 27, 1964, Ser. No. 347,890
1 Claim. (Cl. 322—32)

This invention relates in general to alternating current generators and more particularly to excitation systems for alternating current generators.

Alternating current generators or alternators are often driven by motor vehicle engines, producing an alternating potential whose magnitude and frequency vary as the speed of the motor vehicle engine changes. When the system connected to the alternator output terminals consists of a load such as a refrigeration system, with its attendant fan and compressor motors, it is desirable to operate the alternator with a constant voltage to frequency ratio. Alternating current motors require a constant voltage to frequency ratio in order to operate efficiently and draw a substantially constant line current. However, it is also desirable to reduce the voltage and thus reduce the voltage to frequency ratio when the alternator output voltage reaches a predetermined magnitude, to prevent insulation failures and other problems due to excessive voltage. A standard voltage sensitive relay is not satisfactory for this task, as it requires substantially the same voltage to frequency ratio for operation at all voltages. Further, most frequency sensitive circuits are complicated, which would add to the maintenance of the alternator system, and they are economically unsuitable because their cost is out of proportion with the cost of the alternator system.

Accordingly, it is an object of this invention to provide a new and improved excitation system for alternating current generators.

Another object of this invention is to provide a new and improved excitation system for alternating current generators which provides a substantially constant output voltage to output frequency ratio, until a predetermined voltage is reached.

A further object of this invention is to provide a new and improved excitation system for alternators which reduces the output voltage and the output voltage to output frequency ratio when a predetermined output frequency is reached.

Still another object of this invention is to provide a new and improved excitation system for alternators which prevents the alternator output voltage from exceeding a predetermined magnitude, and which is inexpensively constructed and easy to maintain.

Briefly, the present invention accomplishes the above cited objects by providing a relay, in combination with an alternator excitation system which maintains the alternator output voltage to frequency ratio constant. The excitation system is made frequency sensitive by connecting a capacitor in series circuit relation with the coil of the relay. The relay coil and capacitor are connected to be responsive to the electrical output of the alternator, with the division of the alternator output voltage between the capacitor and relay coil being determined, for a particular value of capacitance, by the output frequency of the alternator. Thus, since the ratio of alternator voltage to frequency is constant, by selection of the proper capacitor rating the alternator output voltage at which the relay will be actuated can be predetermined. The relay contacts may be normally open or normally closed, depending upon the particular excitation system being utilized, and connected such that the excitation voltage applied to the alternator field winding is reduced when the relay is actuated. When the excitation voltage is reduced, the alternator output voltage is reduced accordingly, thus reducing the alternator output voltage to frequency ratio from its substantially fixed value during the period that the alternator would try to produce an excessive voltage.

Further objects and advantages of the invention will become apparent as the following description proceeds and features of novelty which characterize the invention will be pointed out in particularity in the claims annexed to and forming a part of this specification.

For a better understanding of the invention reference may be had to the accompanying drawings, in which.

Figure 1:
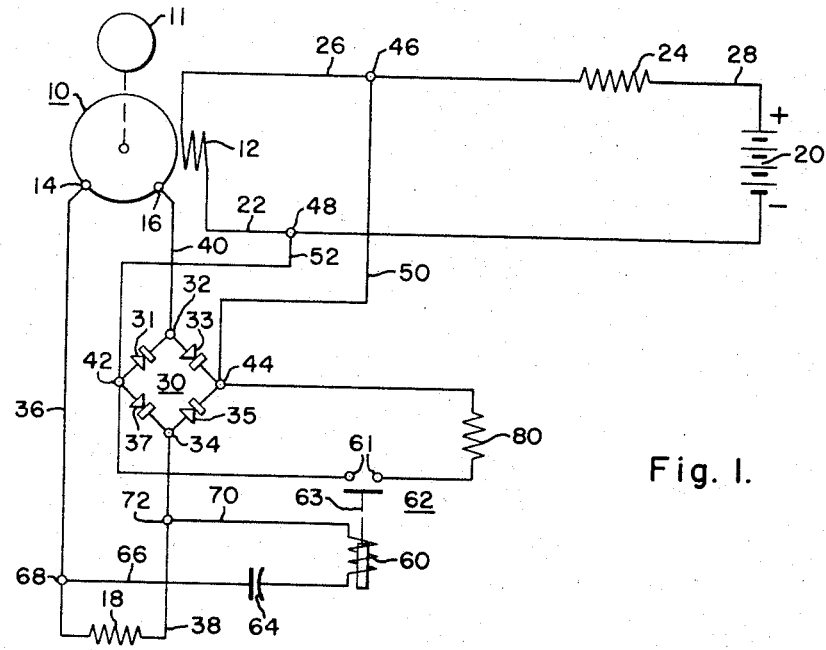
FIGURE 1 is a schematic diagram embodying the teachings of this invention.

Referring now to the drawings, and FIG. 1 in particular, there is shown an alternator 10 having a direct current field winding 12, and output terminals 14 and 16. The alternator may be driven by suitable driving means 11, such as a motor vehicle engine. The alternator 10, as shown, is single phase, but the invention is equally applicable to polyphase alternator systems. Alternator 10 has its output terminals 14 and 16 connected to an alternating current load, which is represented by resistor 18, and which may be a refrigeration system for a motor vehicle truck, or any other load requiring an electrical supply having a constant voltage to frequency ratio. Field winding 12 may receive its excitation potential from a source of unidirectional potential, such as a battery 20, or any other suitable source of unidirectional potential. One side of the field winding 12 may be connected to the negative side of source potential 20 through conductor 22, and the other side of field winding 12 may be connected through current limiting resistor 24 and conductors 26 and 28 to the positive side of source potential 20.

In order to produce an electrical output from alternator 10 which has a substantially constant voltage to frequency ratio, some means may be provided which will add an excitation potential to the field winding 12 whose magnitude is responsive to the load conditions. One method of accomplishing this is shown in FIG. 1, whereby a single phase, full-wave rectifier 30, having rectifier devices 31, 33, 35 and 37, is connected with its input terminals 32 and 34 connected in series circuit relation with the alternator output terminals 14 and 16 and load circuit 18. More specifically, alternator output terminal 14 may be connected to one side of load circuit 18 through conductor 36, and the other side of load circuit 18 may be connected to input terminal 34 of rectifier 30 through conductor 38. The remaining input terminal 32 of rectifier 30 may be connected to alternator output terminal 16 through conductor 40. The output terminals, 42 and 44, of rectifier 30 are connected in circuit relation with field winding 12, with the polarity of the unidirectional output voltage of rectifier 30 adding to the polarity of source potential 20. More specifically, positive output terminal 44 is connected to the positive side of field winding 12 through conductor 50 at junction 46, and the negative output terminal 42 is connected to the negative side of field winding 12 through conductor 52 at junction 48. Thus, when output terminal 16 of alternator 10 is positive, current will flow through conductor 40 to rectifier device 33, through conductors 50 and 26 to field winding 12, through conductors 22 and 52 to rectifier device 37, and through load circuit 18 back to the alternator 10 at output terminal 14. On the next half cycle, when output terminal 14 is positive, current will flow through load circuit 18 to rectifier device 35, through conductors 50 and 26 to field winding 12, through conductors 22 and 52 to rectifier device 31, and back to the alternator 10 at output terminal 16.

Rectifier 30 will apply to unidirectional potential to the field winding 12 responsive to the load conditions, and alternator 10 will produce a desired constant ratio of output voltage to output frequency. However, it is undesirable for the voltage to frequency ratio to remain constant when an excessive voltage magnitude is reached. Before a damaging output voltage is reached, it is desirable to reduce the voltage to frequency ratio, and maintain the output voltage of the alternator within a predetermined magnitude, regardless of the magnitude of the alternator output frequency. Since when the output voltage increases, the output frequency also increases to maintain a constant voltage to frequency ratio, the frequency may be utilized to determine when the output voltage has reached the magnitude where the voltage to frequency ratio should be reduced by reducing the alternator output voltage. This may be accomplished, as shown in FIG. 1, by utilizing a capacitor 64 and a device for making and breaking an electrical system, such as relay 62 having an electromagnetic coil 60, contacts 61, and plunger and linkage mechanism 63. The electromagnetic coil 60 of the alternating potential relay 62 is connected in series circuit relation with capacitor 64, and the series circuit is connected across the alternator 10 to be responsive to its electrical output. More specifically, the capacitor side of the series circuit may be connected through conductor 66 to conductor 36 at junction 68, and the coil side of the series circuit may be connected through conductor 70 to conductor 38 at junction 72. As the alternator frequency and voltage magnitude increase, capacitor 64 will allow a greater percentage of the total alternating potential to be applied to the relay coil 60, as the impedance of the capacitor decreases as the frequency is increased. When the voltage applied to the relay coil 60 reaches a predetermined magnitude, the plunger and linkage mechanism 63 will operate and change the electrical continuity of contacts 61. Contacts 61 may be normally open as shown, or normally closed depending upon the particular design of the excitation system. In the particular excitation system illustrated in FIG. 1, contacts 61 are open and are connected in series circuit relation with a resistor 80 across the output terminals 42 and 44 of rectifier 30. The magnitude of resistor 80 should be such that the field weakening, caused by resistor 80 being connected across the output terminals 42 and 44 of rectifier 30, will produce an alternator output voltage slightly greater than the dropout voltage of relay 62 when connected in series with capacitor 64. Then, when the output frequency is lowered a predetermined amount, the relay plunger 63 will drop out, causing contacts 61 to return to their normally open position, until the output frequency and voltage is again raised to the predetermined point. Thus, the excitation system is frequency sensitive, and deviates from the fixed voltage to frequency ratio at a predetermined frequency by reducing the output voltage.

Figure 2:
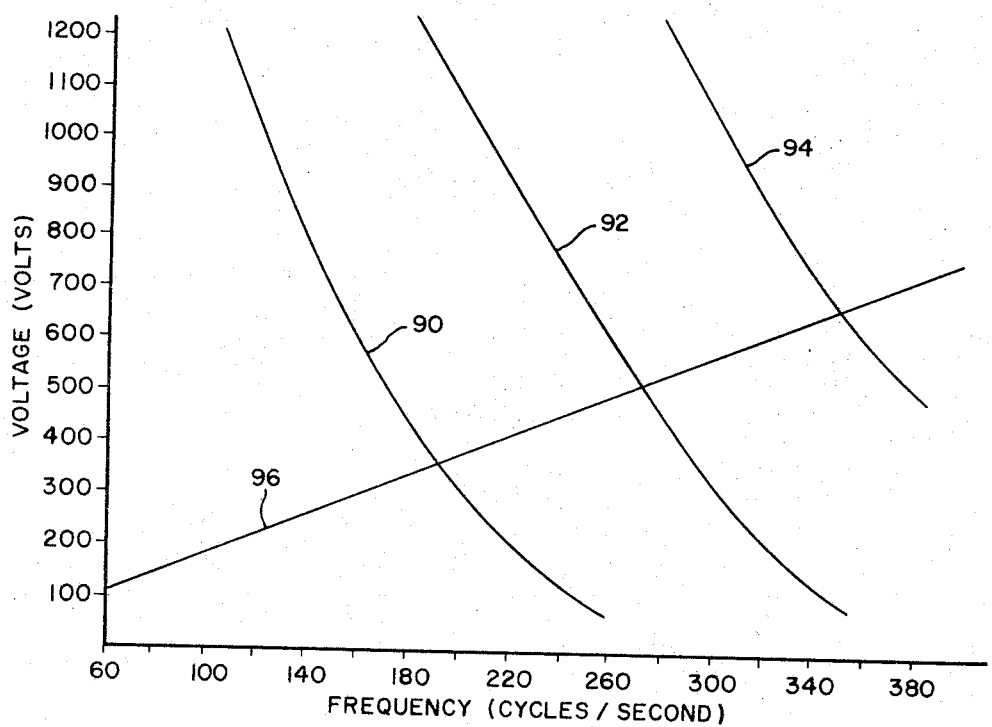
FIG. 2 is a graph illustrating how the rating of capacitor determines the voltage at which the relay is actuated.

The frequency and, therefore, the voltage at which the relay will operate is determined by the rating of capacitor 64. This is illustrated for three different values of capacitance in FIG. 2. The graph in FIG. 2 is constructed with the output frequency of the alternator in cycles per second being plotted on the abscissa, and the output voltage in volts being plotted on the ordinate. The curves 90, 92, and 94 indicate the pickup voltage of a typical alternating current relay versus frequency, when the values of capacitor 64 are .1 mfd., .05 mfd., and .03 mfd., respectively. Curve 96, which is actually a straight line, indicates a typical constant voltage versus frequency ratio, and the intersection of curve 96 with curves 90, 92 and 94 indicates the frequency and voltage at which the relay would be actuated for the different values of capacitor 64. Therefore, for a given voltage to frequency ratio, the desired relay pickup voltage may be determined by simply choosing the proper value for capacitor 64. For example, if it is desired to have the relay pickup or be actuated when the alternator output voltage is approximately 500 volts, a .05 mfd. capacitor would be selected, as shown by curve 92.

The excitation system disclosed herein has many advantages. It allows the excitation system to operate with a constant voltage to frequency ratio, as long as the voltage does not exceed a predetermined magnitude. Once the voltage reaches the predetermined magnitude, as sensed by the alternator frequency, a frequency sensitive network reduces the alternator voltage and thus reduces the voltage to frequency ratio during this period of time. When the frequency is reduced to a predetermined magnitude, the excitation system is again allowed to operate with the desired constant voltage to frequency ratio.

The teachings of the invention disclosed herein may be easily applied to most excitation systems, and the additional components required to produce the results described are inexpensive and easily maintained. The added components cooperate with the basic excitation system, allowing it to operate as long as its characteristics are desirable, but reducing the output voltage by sensing the frequency when the output voltage reaches an undesirable magnitude.

Since numerous changes may be made in the above described apparatus and different embodiments of the invention may be made without departing from the spirit thereof, it is intended that all matter contained in the foregoing description or shown in the accompanying drawings shall be interpreted as illustrative, and not in a limiting sense.

I claim as my invention:
An electrical circuit comprising
 an alternator having a direct current field winding and output terminals,
 prime mover means which may vary in speed, said prime mover means being connected to drive said alternator,
 an alternating current load connected to the output terminals of said alternator,
 first means providing a first direct current voltage, said first means being connected to said field winding to provide an excitation current therein,
 rectifiers means having input terminals connected to the output terminals of said alternator, and output terminals connected to said field winding, said rectifier means providing a second direct current voltage having a magnitude responsive to the magnitude of said alternating current load, said second direct current voltage providing an excitation current in said field winding which adds to that provided by said first direct current voltage, to maintain a substantially constant alternator output voltage to frequency ratio,
 and overvoltage protective means including relay means having an electromagnetic coil and normally open contacts, capacitor means, and impedance means, said relay means having predetermined pickup and dropout voltages, said electromagnetic coil and capacitor means being connected serially across the output terminals of said alternator, said normally open contacts and said impedance means being serially connected across the output terminals of said rectifier means, the value of said capacitance means being selected such that the voltage across said electromagnetic coil will reach the predetermined pickup voltage of said relay means at a predetermined alternator frequency, causing said relay means to close its normally open contacts and connect said impedance means across the output terminals of said rectifier means, the magnitude of said impedance means being selected to reduce the alternator output voltage to frequency ratio, while maintaining the voltage across said electromagnetic coil above the predetermined dropout voltage of said relay means at said predetermined alternator frequency.

References Cited

UNITED STATES PATENTS

| | | | |
|---|---|---|---|
| 1,884,902 | 10/1932 | Spencer | 322—29 |
| 2,282,845 | 5/1942 | Bany | 307—87 |
| 2,363,857 | 11/1944 | Crever et al. | 322—23 |
| 2,719,259 | 9/1955 | Miner | 322—25 |
| 2,998,551 | 8/1961 | Moakler | 322—32 |
| 3,042,850 | 7/1962 | Kern | 322—27 |

MILTON O. HIRSHFIELD, *Primary Examiner.*

J. J. SWARTZ, J. W. GIBBS, *Assistant Examiners.*